Nov. 17, 1959 D. C. HUTCHINS 2,913,230

FOOD AND BEVERAGE MIXER

Filed Dec. 30, 1954

Inventor:
Dwight C. Hutchins,
by Frank L. Neuhauser
His Attorney.

United States Patent Office 2,913,230
Patented Nov. 17, 1959

2,913,230

FOOD AND BEVERAGE MIXER

Dwight C. Hutchins, Milford, Conn., assignor to General Electric Company, a corporation of New York Application December 30, 1954, Serial No. 478,751

7 Claims. (Cl. 259—108)

My invention relates to food and beverage mixing devices and more particularly to mixing and liquefying devices of the type commonly referred to as blenders.

Food and beverage mixers of the type commonly referred to as blenders usually include a base having a driving motor therein, a container for the food to be mixed supported above the base, and some connection between the blades inside the container and the motor in the base. These blenders are normally operated at a relatively high speed and hence the problems attendant upon any lack of exact alignment are greater than under a lower speed operation. This difficulty can, of course, be minimized by establishing very close tolerances but in that case the manufacturing problem, particularly under mass manufacturing operations, is also greatly increased. In accordance with my invention the over-all problem is minimized by providing an improved mounting for the container on the base for achieving freedom for relative movement of the various parts to compensate for any lack of meticulously exact alignment.

Since it is usually necessary to remove the container after each usage thereof for pouring out the contents, it is desirable that it be easily detached from the base mounting and that conversely that it be easily mounted thereon when use is again desired. In accordance with my invention the structure providing for the freedom for relative movement of the parts is also constructed so as to facilitate easy mounting of the container on the base and for easy detaching of the container from the mounting structure.

It is an object of my invention to provide an improved construction for mixing devices such as blenders and the like.

It is another object of my invention to provide an improved arrangement for detachably mounting the mixing container resiliently on the base.

Further objects and advantages of my invention will become apparent as the following description proceeds and the features of novelty which characterize my invention will be pointed out with particularly in the claims annexed to and forming part of this specification.

In carrying out the objects of my invention in one form thereof, one or more supporting members formed of a resilient material are supported on the base. Each such member is formed to include a horizontal groove in the inner wall thereof, and where a plurality of such members are employed, the grooves are arranged in horizontal alignment. The container is formed to provide an outwardly extending horizontal bead near the bottom thereof. The container is then assembled on the supporting members so that this bead is received within the aforementioned grooves for resiliently and detachably supporting the container.

For a better understanding of my invention reference may be made to the accompanying drawing in which Fig. 1 is an elevation view of a blender incorporating an embodiment of my invention.

Figure 1:
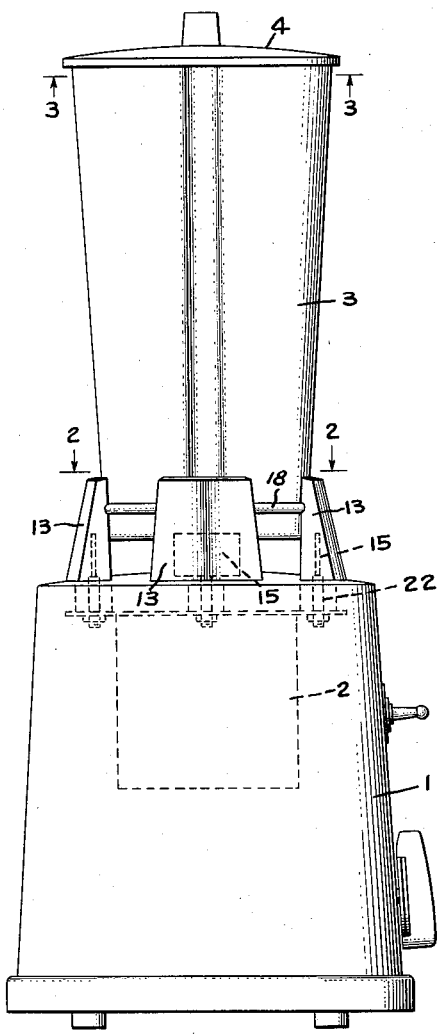
Figure 2:
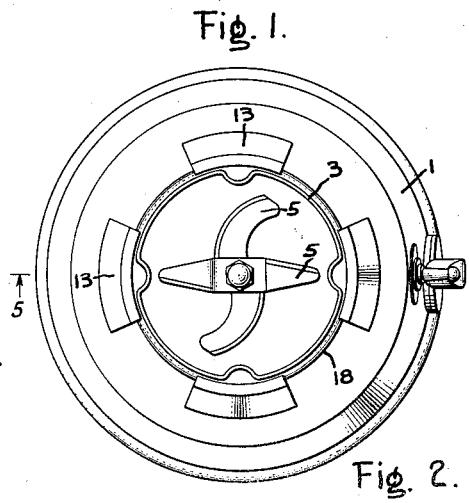
Fig. 2 is a sectional plan view taken along the line 2—2 in Fig. 1.

Referring to the drawing, there is shown a blender which includes a base 1 in which the driving motor for the blades of the blender is supported. The driving motor is indicated only diagrammatically in outline by the dotted lines at 2 in Fig. 1. The blender includes a container 3 in which the food or the material to be mixed or liquefied is placed. This container includes a cover 4 and is adapted to be mounted on the base in accordance with my invention.

One or more blades 5 are rotatably arranged within the container 3 near the bottom thereof for mixing or liquefying the contents of the container. The blades are driven through a coupling structure 6, which may be of any conventional type, from the shaft 7 of the motor 2 mounted in the base 1.

Figure 4:
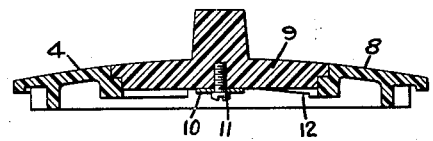
Fig. 4 is a sectional elevation view of the cover.
Figure 3:
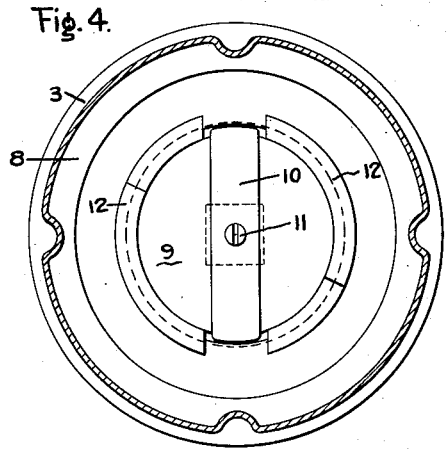
Fig. 3 is a sectional view taken along the line 3—3 in Fig. 1, showing the under side of the cover.

The cover 4 is arranged to have a reasonably tight fit with the mouth of the container 3. In order to permit the ready addition of materials to the container while the mixing operation is continuing, without any danger of liquid overflowing the top of the mixer, the cover is formed in two parts. As shown in Figs. 3 and 4 the cover may include an outer annular member 8, arranged to have a reasonably tight fit with the mouth of the container 3, and an inner circular member 9. The circular member 9 is arranged in removable engagement with the outer annular member 8. In order to mount the central circular member 9 firmly in engagement with the annular member 8, a resilient metal strip 10 is secured by a screw 11 to the underside of the member 9. The ends of this strip are adapted, upon rotation of the member 9, to ride up on cam surfaces 12 formed on the annular member 8 adjacent the central opening therein to secure firm engagement between the two parts of the cover.

In accordance with my invention an improved arrangement is provided for mounting the container 3 on the base 1. For this purpose in the embodiment shown, the support for the container includes a plurality of supporting members 13 are mounted on the upper wall of the base 1. These supporting members are annularly spaced about the top wall of the base. In the particular embodiment shown, four supporting members spaced at 90° intervals are employed. It will be apparent, however, as this description proceeds that a smaller or larger number of supporting members could be utilized for supporting the container in accordance with my invention. If desired, a single member formed as a complete annulus or as an arcuate member extending along more than 180° of the circumference of the container may be employed. However, in my preferred form, a plurality of arcuate spaced supporting members are utilized. In any event, regardless of whether a single continuous member or a plurality of members are employed, there should be at least three points of contact generally equally spaced over more than 180° of the circumference of the container, so as to minimize the possibility of any dislodgement of the container. Where a continuous member is employed, of course, the three spaced points are really part of a continuous line of engagement.

Figure 6:
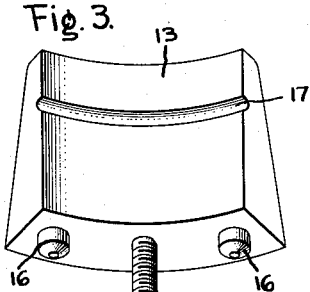
Fig. 6 is a perspective view of one of the supporting members.
Figure 5:
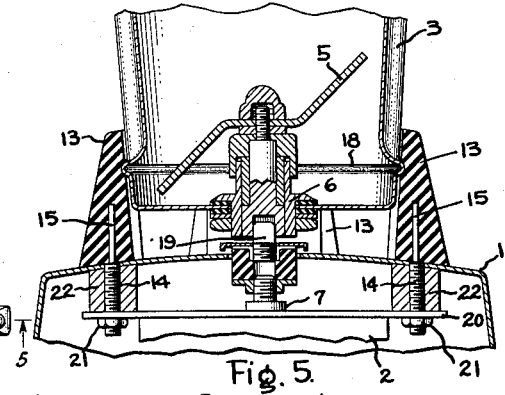
Fig. 5 is a sectional elevation view of a portion of the interior of the blender structure, showing the supporting arrangement in further detail.

Each of the supporting members 13 is formed as is shown in Fig. 6, and each is preferably formed of a resilient material, such as rubber. Referring to Fig. 6, it can be seen that each member 13 includes a depending threaded stud 14 extending downwardly from the generally central portion of the bottom wall of the supporting member. The threaded stud 14 is secured to the member 13 preferably by having a portion thereof molded into the member 13. For example, as best shown in Fig. 5, each stud 14 includes a plate 15 extending a substantial distance into the supporting member 13 and molded integral therewith. The plate 15 also acts as a stiffener for the supporting member.

In addition each supporting member 13 includes two depending locating pins 16 also extending downwardly from the bottom wall thereof, one on each side of the threaded stud 14. Each of these pins is adapted to be received within a corresponding opening (not shown) in the top wall of the base 1.

Each supporting member 13 is provided with a horizontally extending groove 17 in the inner wall thereof. Since each of the members 13 is identical in form, the grooves 17 will be in horizontal alignment when the members are mounted on the base 1. Each groove 17 will, of course, normally be formed during the molding operation as an integral part of the supporting member 13. In order to cooperate with the groove 17 for detachably and resiliently mounting the container on the base, the container in this embodiment of my invention is formed to provide an outwardly extending horizontal bead 18. The bead is formed in the side wall of the container 3 near the bottom thereof and is so spaced from the bottom that when the container is mounted in driving relationship with the motor, the bead is received within the groove 17 formed in the members 13. For convenience the bead 18 is formed extending in a substantially continuous line around the circumference of the container. However, it will be apparent that, within the scope of my invention, individual beads could be formed adapted to register with individual supporting members 13. Also while I have illustrated my invention with an outwardly extending bead formed on the exterior surface of the container and grooves formed in the supporting members, it will be apparent that the structure could be reversed so that an inwardly extending groove is formed in the container and cooperating ribs or beads are formed on the supporting members.

In addition to supporting the container on the base described above, the supporting members 13 are also constructed so as to support the motor 2 from the under side of the top wall of the base. As shown in Fig. 5, each of the threaded studs 14 extends through an opening (not shown) in the top wall of the base. The motor 2 is mounted on the studs by means of a mounting plate or member 20 which is secured to, or formed integral with, the housing of the motor. The studs extend through openings (not shown) in the mounting plate 20 and each is adapted to be engaged by a corresponding nut 21 for both securing the supporting members 13 firmly to the base 1 and securing the motor 2 to the under side of the top wall of the base 1. In order to properly position the mounting plate and the motor and to dampen vibrations, a resilient spacer 22 is placed on each threaded stud 14 and the ends of the spacers engage respectively the under side of the top wall of the base 1 and the mounting plate 20. In addition to the advantage gained by having the supporting members serve the dual purpose of supporting the container and the motor, this arrangement has the further advantage of facilitating the maintenance of alignment of the driving motor and the blade structure. It will be realized that since the motor and the container are both positioned by common members, such alignment is facilitated.

In operation of the mixing device, the container is merely assembled so that the coupling structure 6 is arranged in engagement with the stud shaft 19 projecting upwardly above the base 1 to provide driving engagement between the motor and the blades 5. During this assembly, the bead 18 is received within the groove 17 of the supporting members for resiliently and detachably mounting the container. It will be apparent that this resilient mounting by means of the spaced supporting members 13 allows freedom of some lateral motion of the container during operation and, of course, further allows for any slight misalignment which may occur during manufacture with respect to the rotating parts thereof. This, of course, is in addition to the function of the supporting members in providing easy mounting and detaching of the container.

While I have shown and described a specific embodiment of my invention I do not desire my invention to be limited to the particular construction shown and described and I intend by the appended claims to cover all modifications within the spirit and scope of my invention.

What I claim as new and desire to secure by Letters Patent of the United States is:

1. In a food mixing device, a base, two cooperating structures, one of said structures including a container adapted to be supported on said base, the other of said structures including a plurality of annularly spaced supporting members mounted on said base and extending upwardly therefrom, means for securing said members to said base, said members being formed of resilient material, one of said structures including a generally horizontal groove formed on a vertical surface thereof, the other of said structures including a generally horizontal bead formed on a vertical surface thereof, said resilient material being deformable by said bead, said bead being received within said groove for detachably supporting said container on said base.

2. A food mixing device, a base, a container adapted to be supported on said base, a support for said container including at least one arcuate supporting member mounted on said base and extending upwardly therefrom, means for securing said support to said base, said support being formed from resilient material and including a generally horizontal groove on a vertical face thereof, and a horizontal bead associated with the side wall of said container near the bottom thereof, said bead being received in said horizontal groove for detachably supporting said container on said base, said resilient material being deformable by said bead, said support engaging said container at at least three points generally equally spaced over a distance exceeding 180° of the surface of said container.

3. In a food mixing device, a base, a container adapted to be supported on said base, a plurality of annularly spaced supporting members mounted on said base and extending upwardly therefrom, means for securing said members to said base, said members being formed from resilient material, each of said members including a generally horizontal groove on a vertical face thereof, said grooves being arranged in horizontal alignment with each other, and a horizontal bead associated with the side wall of said container near the bottom thereof, said resilient material being deformable by said bead, said bead being received in said horizontal grooves for detachably supporting said container on said base.

4. In a food mixing device, a base, a container adapted to be supported on said base, a plurality of annularly spaced supporting members mounted on said base and extending upwardly therefrom, means for securing said members to said base, said means including a depending threaded stud formed integral with each supporting member, said studs extending through a wall of said base, and means engaging said studs for securing said supporting members to said base, each of said members including a generally horizontal groove on a vertical face thereof, said grooves being arranged in horizontal alignment with each other, and a horizontal bead associated with the side wall of said container near the bottom thereof, said bead being received in said horizontal grooves for detachably supporting said container on said base.

5. The combination of claim 4 including a mixing element and a driving motor for the mixing element wherein said driving motor is mounted in said base, said motor including a mounting member, said studs extend through openings in said mounting member, and said last-named means engages said mounting plate for both securing said supporting members to said base and supporting said motor from said supporting members.

6. In a food mixing device, a base; a container having a mixing element therein, a motor for driving said mixing element, a support including supporting means mounted on the top wall of said base and extending upwardly and downwardly therefrom, said container being detachably mounted on said support above said base, and said motor being supported from said support below the top wall of said base, said support thereby supporting both said container and said motor whereby alignment of said container and said motor is facilitated.

7. In a food mixing device, a base, a container having a mixing element therein, a motor for driving said mixing element, a plurality of annularly spaced resilient supporting members mounted on the top wall of said base and extending upwardly and downwardly therefrom, said container being detachably supported on the upwardly extending portion of said members, said motor including a mounting plate, means for securing said mounting plate to the downwardly extending portion of said supporting members for supporting said motor from said members below the top wall of said base, and resilient spacers between said top wall of said base and said mounting plate, said supporting members supporting both said container and said motor whereby alignment of said motor and said container is facilitated.

References Cited in the file of this patent

UNITED STATES PATENTS

| | | |
|---|---|---|
| 230,646 | Mort | Aug. 3, 1880 |
| 1,064,603 | Boring | June 10, 1913 |
| 1,237,585 | Tripke | Aug. 21, 1917 |
| 1,959,262 | Colabrese | May 15, 1934 |
| 2,284,155 | Landgraf | May 26, 1942 |
| 2,304,476 | Poplawski | Dec. 8, 1942 |
| 2,761,659 | Collura | Sept. 4, 1956 |